(12) United States Patent
Sirman et al.

(10) Patent No.: US 6,514,314 B2
(45) Date of Patent: Feb. 4, 2003

(54) CERAMIC MEMBRANE STRUCTURE AND OXYGEN SEPARATION METHOD

(75) Inventors: John Derrick Sirman, Tonawanda, NY (US); Jack C. Chen, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 182 days.

(21) Appl. No.: 09/727,472

(22) Filed: Dec. 4, 2000

(65) Prior Publication Data

US 2002/0106495 A1 Aug. 8, 2002

(51) Int. Cl.$^7$ .............................................. B01D 53/22
(52) U.S. Cl. ......................... 95/54; 96/4; 96/11
(58) Field of Search ............................. 95/45, 54; 96/4, 96/11

(56) References Cited

U.S. PATENT DOCUMENTS

| 5,240,480 A | * | 8/1993 | Thorogood et al. .......... 95/54 X |
| 5,306,411 A | | 4/1994 | Mazanec et al. ............. 204/265 |
| 5,478,444 A | | 12/1995 | Liu et al. ....................... 204/59 |
| 5,753,007 A | * | 5/1998 | Russek et al. ............... 95/54 X |
| 5,817,597 A | * | 10/1998 | Carolan et al. .............. 95/54 X |
| 5,911,860 A | | 6/1999 | Chen et al. .................. 204/295 |
| 5,938,822 A | * | 8/1999 | Chen et al. ................... 95/54 X |
| 6,090,500 A | * | 7/2000 | Ishihara et al. ............... 96/4 X |
| 6,146,445 A | * | 11/2000 | Chen et al. ................... 95/54 X |
| 6,165,431 A | * | 12/2000 | Mackay et al. .............. 95/54 X |
| 6,187,157 B1 | * | 2/2001 | Chen et al. ................... 96/11 X |
| 6,264,811 B1 | * | 7/2001 | Wang et al. .................. 95/54 X |
| 6,368,383 B1 | * | 4/2002 | Virkar et al. ................... 95/54 |

OTHER PUBLICATIONS

Dusastre et al., "Optimisation of Composite Cathodes for Intermediate Temperature SOFC Applications", Solid State Ionics 126 (1999) pp. 163–174.

* cited by examiner

*Primary Examiner*—Robert H. Spitzer
(74) *Attorney, Agent, or Firm*—David M. Rosenblum

(57) ABSTRACT

A ceramic membrane structure and method for separating oxygen from an oxygen containing feed at temperatures above about 600° C. The membrane is provided with a dense layer and one or more active porous layers. The dense layer contains at least a mixed conducting material and the active porous layer is formed of a mixture having an ion conducting phase capable of predominantly conducting oxygen ions and a mixed conducting phase capable of conducting both oxygen ions and electrons. The ion conducting phase is present within the mixture in an amount greater than a percolation threshold and the mixed conducting material and phase have a greater electronic conductivity than ionic conductivity.

12 Claims, 3 Drawing Sheets

CERAMIC MEMBRANE STRUCTURE AND OXYGEN SEPARATION METHOD

FIELD OF THE INVENTION

The present invention relates to a ceramic membrane structure and method of separating oxygen with the use of the ceramic membrane structure. More particularly, the present invention relates to such a ceramic membrane structure and method in which the membrane structure is formed of a mixture of an ionic conducting material and a mixed conducting material. Even more particularly, the present invention relates to such a ceramic membrane structure and method in which the membrane structure is formed by dense and porous supporting layers that are formed from the mixture of materials.

BACKGROUND OF THE INVENTION

Oxygen-selective ceramic membranes are fabricated from a ceramic that conducts oxygen ions at high temperatures. In such a ceramic membrane, the heated membrane is exposed to an oxygen-containing gas that ionizes at a cathode side of the membrane. Under a driving force of a differential oxygen partial pressure, oxygen ions are transported through the membrane to an opposite anode surface. The oxygen ions combine at the anode surface of the membrane to give up electrons that are transported through the membrane or a separate electronic pathway to ionize the oxygen at the cathode side of the membrane.

The resistance to oxygen ion transport is in part dependent on the thickness of the membrane. Therefore, very thin membranes are desirable. A recent development in ceramic membrane technology is to form a thin dense layer of ion transport material on a porous support. The dense layer conducts oxygen ions and the supporting structure functions as a percolating porous network to add structural support to the dense layer. The porous support may also be fabricated from a material that is itself capable of transporting ions so as to be active in separating the oxygen.

The materials used in forming ceramic membrane can be classified as either mixed conductors that are capable of conducting both the oxygen ions and the electrons required to initially ionize the oxygen or ionic conductors that are capable of conducting only the oxygen ions. Ionic conductors require separate electrical pathways for the conduction of the electrons.

An example of an ionic conductor with separate electrical pathways can be found in U.S. Pat. No. 5,306,411. In this patent, solid membranes are disclosed that comprise a multi-phase mixture of an electronically conductive material such as a noble metal and an ion conductive material for use in oxygen separation from air for electrochemical reactions and applications. The oxygen ion conductor facilitates all the oxygen transport and the electronic conductor does not take part in the oxygen permeation but rather, provides the required electronic pathway for electrons.

In ion conducting materials such as discussed above, a volumetric inefficiency results from the fact that part of the volume of the membrane is taken up with the electronically conductive material that does not take part in ion transport. Mixed conducting materials can therefore be said to be more efficient than ion conducing materials on a volumetric basis. However, the ceramics utilized in mixed conductors present several problems in realizing a multi-layer composite having dense and active supporting layers. One major problem is that such ceramics, commonly oxygen deficient perovskites, are not particularly robust. This problem is addressed in U.S. Pat. No. 5,911,860 which discloses the addition of a metallic or ceramic second phase to a mixed conducting perovskite to improve the mechanical strength of the material and prevent microcracking. The ceramic second phase is not present above the percolation threshold and as such, does not contribute to the separation. Hence, such a material is also not as efficient in terms of oxygen ion transport on a volumetric basis as a membrane formed of the mixed conducting perovskite alone. Moreover, even where a strong material is selected for the porous supporting layer, there can be a thermal incompatibility between the dense layer and the supporting layer which arises from the materials making up such layers having different thermal coefficients of expansion.

It is to be noted that there have been materials fabricated from a mixture of a mixed conducting phase and an ionic conducting phase where the ionic conducting phase is present above the percolation limit. For instance, in V. Dusastre et al., "Optimization of Composite Cathodes for Intermediate Temperature SOFC Applications", Solid State Ionics, Vol. 126, p163, a two phase porous material consisting of $La_{0.8}Sr_{0.4}Co_{0.2}Fe_{0.8}O_{3-\delta}$ (a mixed conductor) and $Ce_{0.9}Gd_{0.1}O_{2-\delta}$ (an ionic conductor) is used to improve the cathodic polarization of an electrode in a fuel cell. In the fuel cell structure disclosed in this article, the electrode is a thin layer of material of about 10–15$\mu$m without supporting capability that is used to conduct electrons from or to an external load. The electrolyte itself thus has a higher ionic conductivity than electronic conductivity and is not designed to conduct electrons. Another example of such a two phase mixture can be found in U.S. Pat. No. 5,478,444 which discloses a mixture of an oxygen ion conducting phase such as bismuth or cerium oxides and an electronic conducting phase such as a metal or perovskite. In this patent the oxygen ion conductor facilitates all the oxygen transport and the electronic conductor does not take part in the oxygen permeation.

A further problem with perovskites, is that chemically induced strains may be introduced in a supporting structure fabricated from such materials. As the oxygen partial pressure is reduced in a membrane formed from a perovskite, such as on the anode side thereof, there is an initial expansion followed by a substantial contraction. The contraction is due to the chemical instability of the material. The transition metal cations are reduced and the perovskite structure is no longer maintained. Prolonged exposure to a reduced oxygen partial pressure can produce an irreversible transition. Such problems are exacerbated where the supporting layer is exposed to a fuel gas such as in a reactive purge or in reforming operations because part of the membrane is exposed to the lowest oxygen activity in the membrane coupled with fuel diffusing into the membrane.

As will be discussed, the present invention provides a ceramic membrane structure and a method of separating oxygen in which the membrane structure has a dense layer supported by one or more active porous layers formed of a mixture of a mixed conductor and an ionic conductor that allows for a more efficient oxygen ion transport than membranes of the prior art. Moreover, a membrane of the present invention is more chemically stable, mechanically stronger and has superior creep resistance than membranes employing mixed conductors alone.

SUMMARY OF THE INVENTION

The present invention, in one aspect, provides a ceramic membrane structure for separating oxygen from an oxygen containing feed comprising a dense layer and at least one active porous layer. It is to be noted that the term, "oxygen containing feed" as used herein and in the claims means a gaseous mixture containing oxygen such as air or a gas containing oxygen in a combined form such as water. Furthermore, the term, "dense layer" as used herein and in the claims means a layer that is essentially impervious to the passage of the oxygen molecules to be separated from the gaseous mixture as opposed to a porous layer that would permit such passage. Such a layer can be made extremely thin to lessen the degree of resistance to oxygen ion transport through such a layer. A thin dense layer, however, has to be mechanically supported. The requisite support is provided by a porous supporting layer that is active so that it can take part in the oxygen ion transport.

In the present invention, the dense layer contains at least a mixed conducting material and the at least one active porous layer is formed of a mixture having an ion conducting phase capable of predominantly conducting oxygen ions and a mixed conducting phase capable of conducting both said oxygen ions and electrons. The ion conducting phase is present within the mixture in an amount greater than a percolation threshold. The mixed conducting material of the dense layer and the mixed conducting phase of the at least one active porous support have greater electronic conductivity than ionic conductivity.

In a further aspect, the present invention provides a method of separating oxygen from an oxygen containing feed stream. In accordance with such method, the feed stream is introduced to a cathode side of a ceramic membrane element having a membrane structure of the type set forth above. During the introduction of the feed stream to the cathode side of said ceramic membrane, the membrane is maintained at a temperature of at least about 600° C. and a pressure difference is maintained across said membrane from said cathode side to an opposite anode side thereof.

In either aspect of the present invention, the ion conducting phase can be formed of a first material having an oxygen ion conductivity greater than about 0.01 S/cm at 1000° C. in air and the mixed conducting phase can be formed from a second material having an oxygen ion conductivity of greater than about 0.01 S/cm at 1000° C. in air and an electronic conductivity greater than about 0.02 S/cm at 1000° C. in air. The first material can be a fluorite, a bismuth oxide, an apatite oxide, and mixtures thereof and the second material can be a perovskite or a brownmillerite. Preferably, one of the first and second materials is present within the mixture in an amount of no less than about 5% by volume and the other of the first and second materials is present within said mixture at no greater than about 95% by volume. More preferably, one of the first and second materials is present within the mixture in an amount of no less than about 10% by volume and the other of the first and second materials is present within said mixture at no greater than about 90% by volume. Most preferably, one of the first and second materials is present within the mixture in an amount of no less than about 20% by volume and the other of the first and second materials is present within said mixture at no greater than about 80% by volume.

In the present invention, the ion conducting phase of the mixture is present above the percolation limit so that not only does it enhance properties such as strength, creep resistance, and chemical stability, but also, it is able to contribute to the ionic conduction within the material. Thus, the mixed conducting phase significantly contributes to the required electronic transport and both the mixed and ionically conducting phases contribute to the oxygen ion transport. This results in a membrane that is more efficient on a volumetric basis than prior art composite membranes in which part of the membrane volume is taken up by materials that do not contribute to oxygen ion conduction. It is to be noted that where the prior art employs a second metallic phase, such second phase is typically a noble metal that increases the cost of the membrane. Moreover, metal/ceramic dual phase materials are also not stable in fuel conditions due to metal segregation and dewetting of the metal. A central advantage of the present invention is that thermal expansions between the dense and active porous layers can be closely matched. For instance, the dense layer can be formed from a perovskite and the porous supporting layer can be formed from a mixture containing about 50% by volume of the perovskite and about 50% by volume of the ion conducting phase. Other combinations are of course possible, for instance, forming both the dense and active porous layers from the mixture of mixed conducting and ionic conducting phases. The most preferred composition of the porous support is dependent on the operating temperature of the membrane. At high operating temperatures the membrane is more active but requires more robust supporting materials. At lower temperatures the process is less active and thus requires more active materials, but does not require as robust a substrate. Therefore at temperatures about 1050° C. the most preferred composition may contain about 80% by volume of the oxygen ion conducting phase and about 20% by volume of the mixed conducting phase, while at 750° C. the most preferred composition may contain about 20% by volume of the oxygen ion conducting phase and about 80% by volume of the mixed conducting phase.

As mentioned above, single-phase perovskite materials that have sufficient oxygen ion conductivity have high and very non-linear thermal expansion. As will be shown, a material of the present invention has lower thermal and compositional expansions than prior art materials.

A still further advantage of the present invention concerns the fact that the maximum oxygen flux in a membrane is achieved when the ionic transport number (the ratio of the oxygen ion conductivity to the total conductivity) is about 0.5. Typically mixed conducting perovskites have an ionic transport number of 0.01, while the ionic transport number of ion conducting fluorites is greater than about 0.9. Thus adding the two phases brings the overall ionic transport number for the membrane closer to the desired 0.5.

BRIEF DESCRIPTION OF THE DRAWINGS

While the specification concludes with claims distinctly pointing out the subject matter that Applicants regard as their invention, it is believed the invention will be better understood when taken in connection with the accompanying drawings in which:

DETAILED DESCRIPTION

Figure 1:
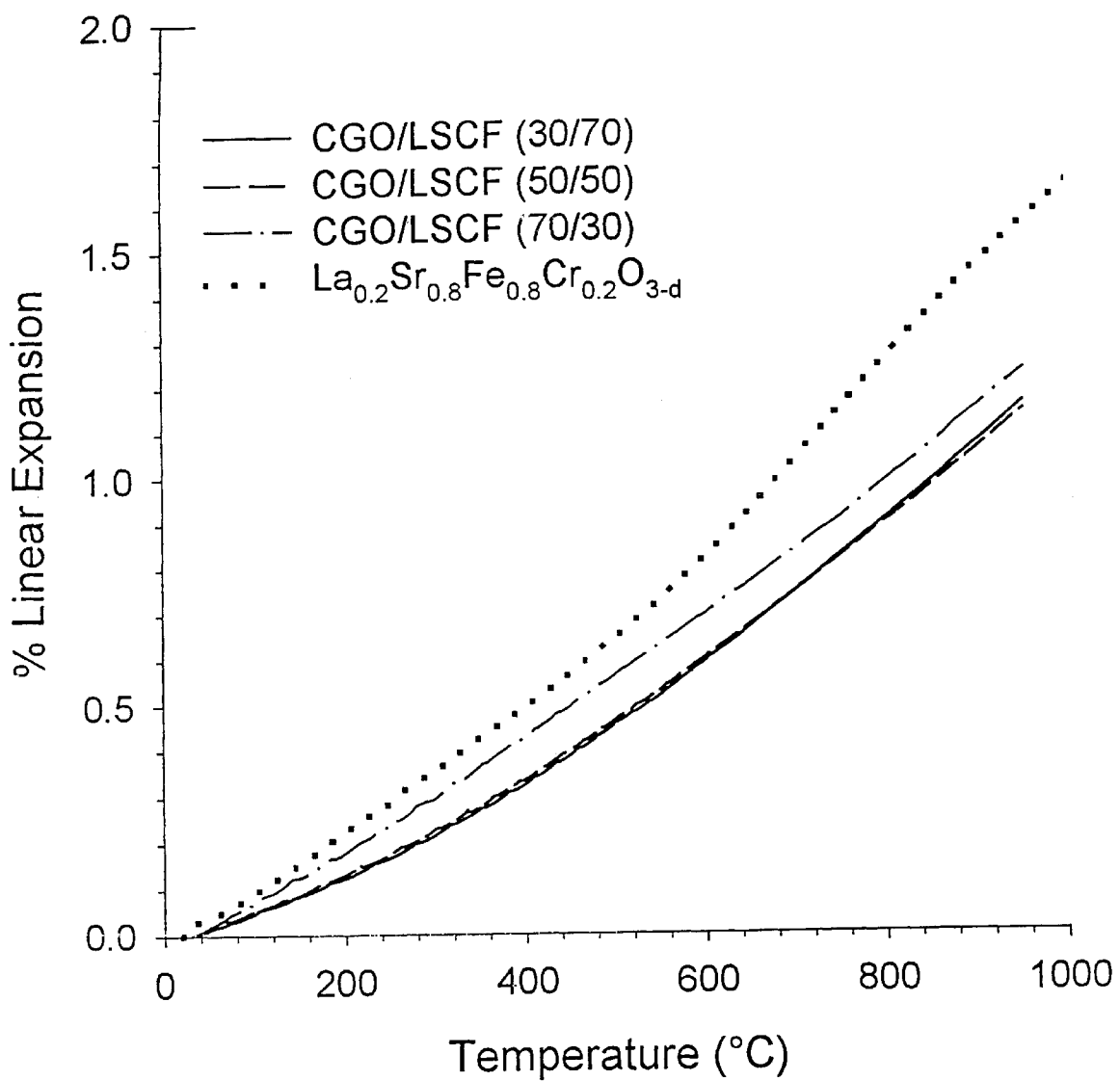
FIG. 1 is a graphical representation of thermal expansions of mixtures of mixed and ionic conducting materials of the present invention as compared with that of a mixed conducting material alone.

An oxygen-selective ceramic membrane structure of the present invention can be used to form ceramic membrane elements in the form of stacks of plates or bundles of tubes that are set within known reactors. The oxygen containing feed is heated by combusting the fuel in the presence of part of the oxygen of the feed and then introducing the feed into the reactor or membrane elements. Alternatively, the reactor itself may be heated or the oxygen containing feed may be heated by indirect heat exchange with various heated process streams. Oxygen ions are transported through the membrane elements and are collected or further reacted and discharged. In case the oxygen is fed into the membrane elements, fuel and steam can be fed into the reactor. A catalyst can be supplied for resultant steam methane reforming reactions. Alternatively, the oxygen containing feed can be introduced into the reactor for oxygen ion transport through the membrane elements. Other possible applications include oxygen separation itself for nitrogen production as well as other possible chemical oxidative processes. A positive oxygen partial pressure is applied across the membrane structure by either compressing the feed or by removing the feed at the anode side of the membrane by a sweep gas or a reactant or a combination of all of the foregoing mechanisms.

In a membrane structure in accordance with the present invention, an active porous supporting layer and possibly also the dense layer uses a multi-phase heterogeneous material that incorporates both an oxygen ion conducting phase and mixed electronic ionic conducting phase that can be used to separate oxygen from a gas stream containing oxygen by oxygen ion conduction at temperatures in excess of 600° C. The mixed electronic ionic conducting phase is preferably an oxygen deficient perovskite or a brownmillerite. The ionic conducting phase is preferably a non-perovskite such as a fluorite, a bismuth oxide, an apatite oxide, and mixtures thereof.

An oxygen-selective ceramic membrane structure of the present invention may have more than one active supporting layers and optionally inert porous supporting layers. Such membranes are fabricated from a variety of known techniques such as slurry coating and co-firing and typically have a dense layer of anywhere from between about 1 and about 200 micrometers in thickness either sandwiched or supported on one side by an active porous supporting layer(s) of about 200 to about 20000 micrometers in thickness. The porous supporting layers can have pores ranging from between about 1 and about 50 micrometers and a porosity ranging from about 30% to about 50%. The dense layer can be formed of a variety of materials including but not limited to strontium doped lanthanum ferrite, for instance, $La_{0.8}Sr_{0.2}Co_{0.2}Fe_{0.8}O_x$ and the active porous supporting layer can be formed of between about 5% and about 95% by volume of $Ce_{0.8}Gd_{0.2}O_{1.9}$ and between about 5% and about 95% by volume of $La_{0.8}Sr_{0.2}Co_{0.2}Fe_{0.8}O_{3-d}$. Other possible formulations are possible including those containing ion conducting phases formed from yttria stabilized zirconia, urania, partially stabilized zirconia, $La_2Mo_2O_9$, perovskites that are ion conductors, and ion conducting pyrochlores and mixed conducting phases formed from the series of perovskites that include lanthanide, alkaline earth and transition metals, materials of the Ruddelson-Popper phase, mixed conducting fluorites.

It is to be noted that the composition of the ionic conducting and mixed conducting phases need not be constant throughout a layer of material. For instance, layers may be fabricated having a varying composition, for instance, in a radial direction of a tubular layer, for thermal or chemical compatibility. Additionally, composition may also be made to vary along the length of an element to obtain desirable thermal expansion characteristics and improved sealing options. For example, in a tubular element, the end or ends of the tube to be sealed might entirely be an ionic conducting phase because such materials generally have very linear expansion characteristics and hence, are easier to match with those of a metal to which such a tubular element were to be sealed.

The following examples are set forth with specific materials and process conditions to specifically exemplify materials of the invention and should not limit the invention in any way.

EXAMPLE 1

$Ce_{0.8}Gd_{0.2}O_{1.9}+La_{0.6}Sr_{0.4}Co_{0.2}Fe_{0.8}O_{3-d}$ Two Phase Material Mixed at a 30%/70% Volume Ratio (CGO/LSCF (30/70))

$Ce_{0.8}Gd_{0.2}O_{1.9}$ ("CGO") was intimately mixed with $La_{0.6}Sr_{0.4}Co_{0.2}Fe_{0.8}O_{3-d}$ ("LSCF") in the desired ratio to produce a mixture of about 30 volume % CGO and about 70 volume % LSCF. This CGO/LSCF material was then pressed into disc, bar and tube forms and sintered in the temperature range of 1200–1400° C. to produce a heterogeneous two-phase material.

With reference to FIG. 1, the thermal expansion of the two-phase material was measured using a dilatometer from 25–950° C. It is to be noted that dilatometry is used to measure the expansion of materials as a result of temperature increase. In case of oxide ceramics, the expansion is a result of the increase in amplitude of oscillation of the ions as the temperature increases and also, the loss of oxygen in the lattice. The thermal expansion coefficient ("TEC") of a material is a measure of the rate of expansion as a function of temperature. It is calculated by dividing the absolute linear expansion over a given temperature range by the temperature range. Oxygen loss from the lattice results in a considerable deviation from linearity in the TEC. It is desirable to have a membrane material with a low and constant TEC over the temperature range to which it is exposed.

Figure 2:
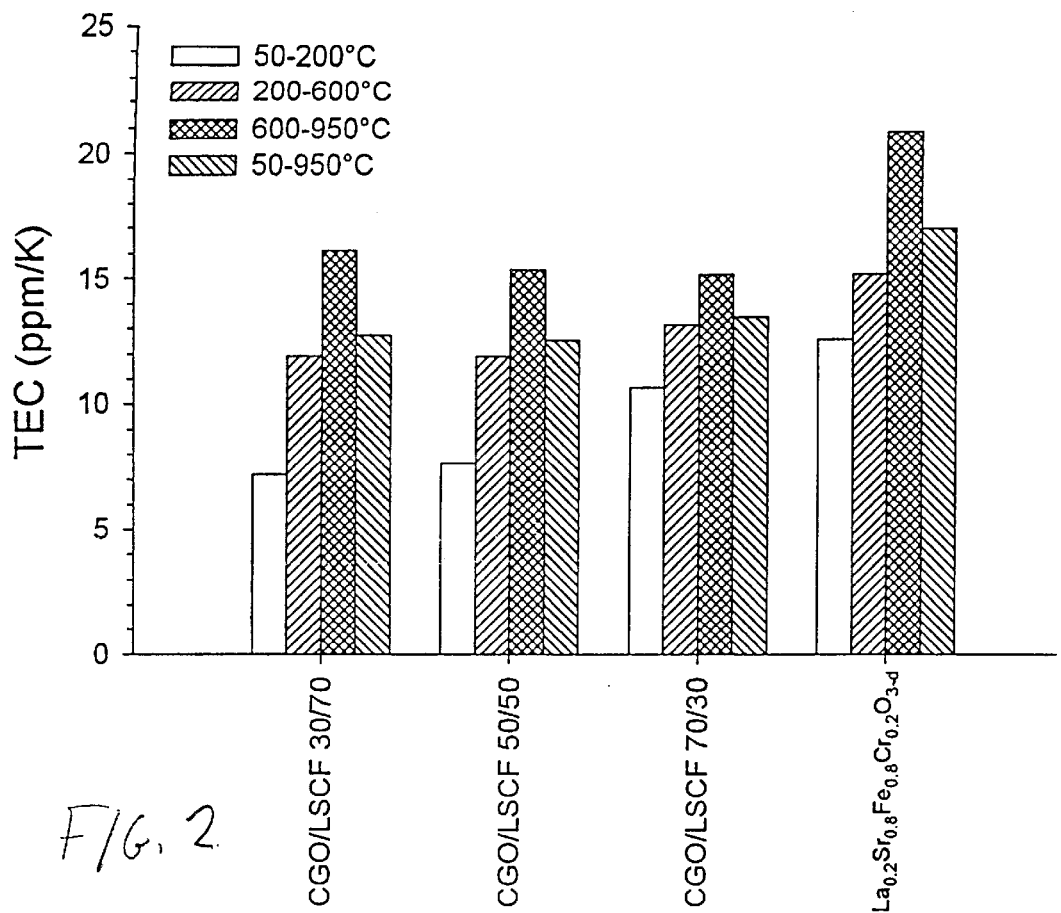
FIG. 2 is a graphical representation of the thermal expansion coefficients of mixtures of mixed and ionic conducting materials of the present invention compared with that of a mixed conducting material alone.

As shown in FIG. 1, the total expansion of the two-phase material was about 1.16% and the two-phase material had a mean TEC of about 12.5 ppm/K as shown in FIG. 2. This proved to be significantly less than a sample of the single phase $La_{0.2}Sr_{0.8}Fe_{0.8}Cr_{0.2}O_{3-d}$ which had a total expansion of about 1.56% and a mean TEC of about 16.9 ppm/K.

Figure 3:
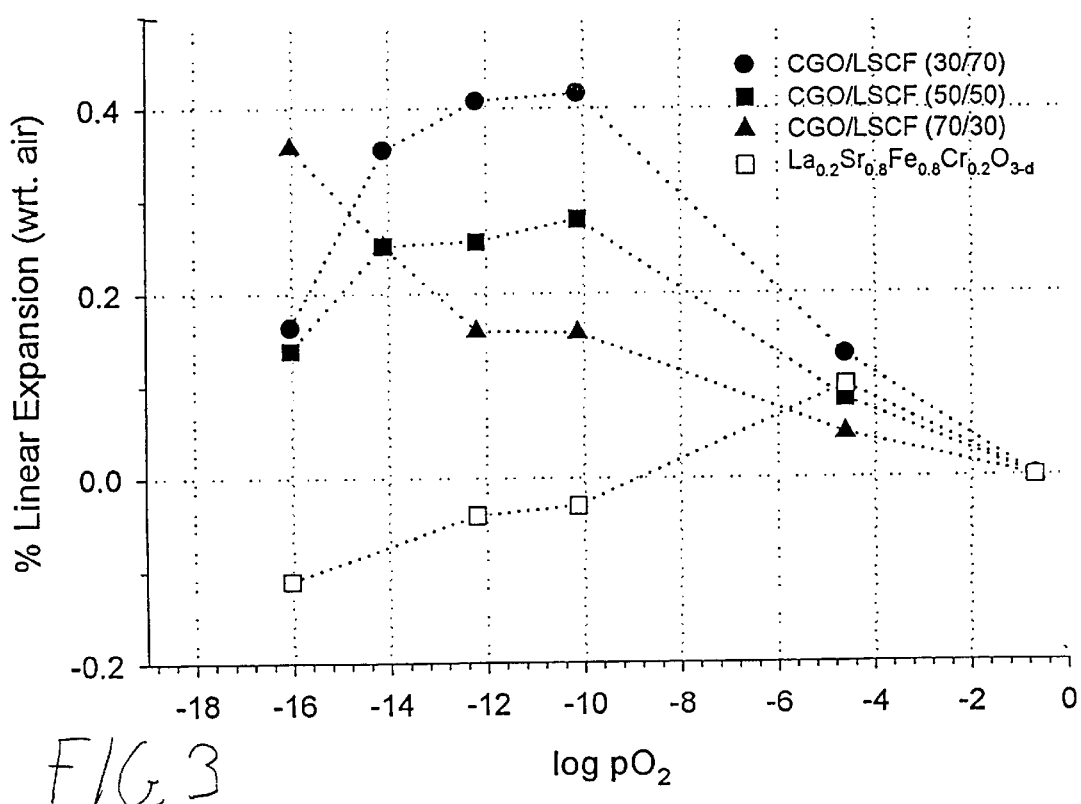
FIG. 3 is a graphical representation of the oxygen chemical potential expansions of mixtures of mixed and ionic conducting materials of the present invention as compared with that of a mixed conducting material alone.

With reference to FIG. 3, the expansion due to changes in the partial pressure of oxygen was measured at 950° C. from $PO_2=0.2$ to $PO_2=10^{-16}$ using mixtures of CO, $CO_2$, $N_2$ and air. As represented in FIG. 3, it can be seen that the contraction that occurs in the single phase $La_{0.2}Sr_{0.8}Fe_{0.8}Cr_{0.2}O_{3-d}$ sample did not occur in two-phase mixture of CGO and LSCF.

Figure 4:
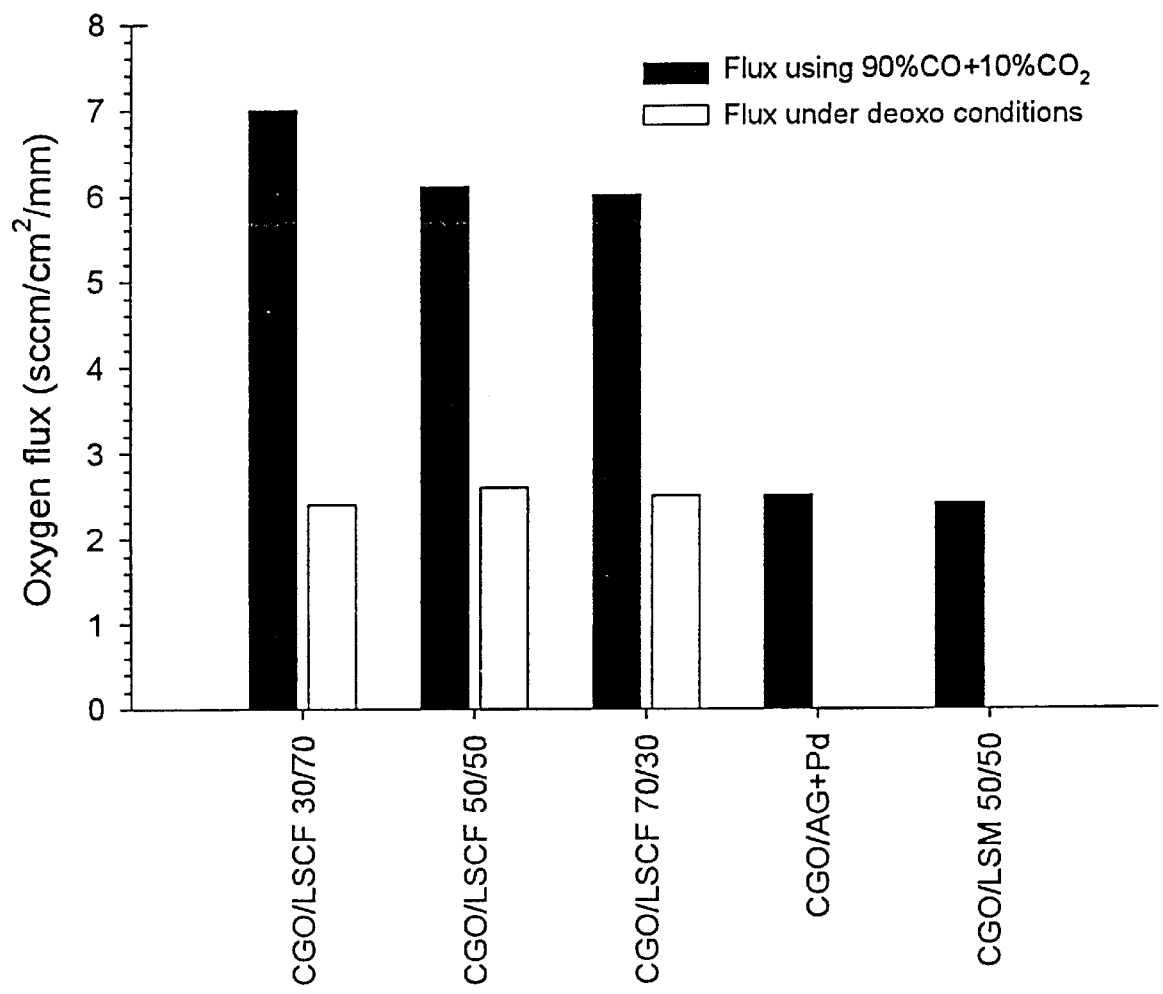
FIG. 4 is a graphical representation of oxygen flux measurements of mixtures of mixed and ionic conducting materials of the present invention.

With reference to FIG. 4, oxygen permeation was measured on discs of the two-phase mixture using a 90%CO/10%$CO_2$ (by volume) gas stream on one side and air on the other side, with flow rates of one liter per minute on both sides. The discs were maintained at a temperature of about 1000° C. It is to be noted that commercially significant fluxes can be obtained in membrane elements formed of materials outlined herein at temperatures at and above 600° C. A maximum flux of about 7 sccm/cm² for a 1 mm thickness was obtained for the two-phase material under consideration in this example. This flux is significantly higher than obtained using CGO/Ag +Pd two-phase discs where oxygen fluxes of about 1 and about 4 sccm/cm$^2$ for a 1 mm thickness were obtained. It is to be noted that oxygen flux measurements on single phase LSCF are not possible under 90%CO/10%CO$_2$ gas conditions because the material is chemically unstable.

Oxygen permeation was measured on tubes of the material using a 40%CH$_4$/60%N$_2$ gas stream on one side and air on the other side. The flow of the air was decreased until all the oxygen was removed from the gas stream, creating deoxo conditions. A flux of about 2.4 sccm/cm$^2$ for a 1 mm thickness was obtained for the two-phase material of this example at deoxo conditions. This is comparable to oxygen flux measurements made on the La$_{0.2}$Sr$_{0.8}$Fe$_{0.8}$Cr$_{0.2}$O$_{3-d}$ single phase sample.

EXAMPLE 2

Ce$_{0.8}$Gd$_{0.2}$O$_{1.9}$+La$_{0.8}$Sr$_{0.2}$Co$_{0.2}$Fe$_{0.8}$O$_{3-d}$ Two Phase Material Mixed at a 50%/50% Volume Ratio (CGO/LSCF (50/50))

CGO was intimately mixed with LSCF in the desired ratio to produce a mixture of 50 volume % CGO and 50 volume % LSCF. This two phase material was then pressed into disc, bar and tube forms and sintered in the temperature range of 1200–1400° C. to produce a heterogeneous two-phase material. The thermal expansion of the material was measured using a dilatometer from 25–950° C. The total expansion as shown in FIG. 1 was about 1.1% and the mean TEC, as shown in FIG. 2 was about 11.9 ppm/K.

FIG. 3 shows that the contraction that occurs in the single phase LSCF sample at low oxygen partial pressures did not occur in the two-phase mixture of CGO/LSCF (50/50). With continued reference to FIG. 4, a maximum flux of about 6.1 sccm/cm$^2$ for a 1 mm thickness was obtained for the two phase mixture which again was significantly higher than obtained for the CGO/Ag +Pd two-phase discs. Further, a flux of 2.6 sccm/cm$^2$ for a 1 mm thickness of the mixture was obtained at deoxo conditions. This again is comparable to oxygen flux measurements made on single phase La$_{0.2}$Sr$_{0.8}$Fe$_{0.8}$Cr$_{0.2}$O$_{3-d}$.

EXAMPLE 3

Ce$_{0.8}$Gd$_{0.2}$O$_{1.9}$+La$_{0.8}$Sr$_{0.2}$Co$_{0.2}$Fe$_{0.8}$O$_{3-d}$ Two Phase Material Mixed at a 70%/30% Volume Ratio (CGO/LSCF (70/30))

CGO was intimately mixed with LSCF in the desired ratio to produce a mixture of about 70 volume % CGO and about 30 volume % LSCF. This two phase material was then pressed into disc, bar and tube forms and sintered in the temperature range of 1200–1400° C. to produce a heterogeneous two-phase material. With reference again to FIG. 1, the thermal expansion of the material was about 1.2% and as shown in FIG. 2, the mean TEC was about 12.9 ppm/K. With further reference to FIG. 3, the contraction that occurs in single phase La$_{0.2}$Sr$_{0.8}$Fe$_{0.8}$Cr$_{0.2}$O$_{3-d}$ at low oxygen partial pressures did not occur in the two phase sample of CGO/LSCF (70/30). As shown in FIG. 4, a maximum flux of about 6 sccm/cm$^2$ for a 1 mm thickness was obtained for the sample. The flux measured under deoxo conditions was about 2.6 sccm/cm$^2$ for a 1 mm thickness.

The examples use a fluorite as the ionic conductor and a perovskite as the electronic conductor. However, the invention is not intended to be limited to these crystal structures. The invention preferably includes the use of any ionic conductor for the oxygen ion conducting phase having an oxygen ion conductivity at 1000° C. of greater than about 0.01 S/cm (siemans/centimeter). This includes CGO, bismuth oxides, and apetite oxides such as La$_{10-x}$Sr$_x$SiO$_{27}$ and La$_{10-x}$Sr$_x$GeO$_{27}$. The invention preferably also includes the use of any mixed conductor for the mixed conducting phase having an ionic conductivity in air of greater than about 0.01 S/cm at 1000° C. and an electronic conductivity of greater than about 0.02 S/cm at 1000° C. under dynamic operating conditions. This includes, but is not limited to perovskites such as La$_x$Sr$_{1-x}$Fe$_{1-y-z}$Co$_y$Cr$_z$O$_{3-d}$. The following table exemplifies useful mixed conductors.

EXAMPLES OF MIXED CONDUCTING SOLID ELECTROLYTES

Material composition 1. (La$_{1-x}$Sr$_x$)(Co$_{1-y}$Fe$_y$)O$_{3-\delta}$ (0 ≤ x ≤ 1.1, 0 ≤ y ≤ 1.1, δ from stoichiometry)
2. SrMnO$_{3-\delta}$
   SrMn$_{1-x}$Co$_x$O$_{3-\delta}$ (0 ≤ x ≤ 1, δ from stoichiometry)
   Sr$_{1-x}$Na$_x$MnO$_{3-\delta}$
3. BaFe$_{0.5}$Co$_{0.5}$YO$_3$
   SrCeO$_3$
   YBa$_2$Cu$_3$O$_{7-\delta}$ (0 ≤ δ ≤ 1, δ from stoichiometry)
4. La$_{0.2}$Ba$_{0.8}$Co$_{0.8}$Fe$_{0.2}$O$_{2.6}$; Pr$_{0.2}$Ba$_{0.8}$Co$_{0.8}$Fe$_{0.2}$O$_{2.6}$
5. A$_x$A'$_{x'}$A"$_{x"}$B$_y$B'$_{y'}$B"$_{y"}$O$_{3-z}$ (x, x', x", y, y', y" and z all in 0–1 range)
   where: A, A', A" = from groups 1, 2, 3 and f-block lanthanides
   B, B', B" = from d-block transition metals
6. 
   | | | |
   |---|---|---|
   | (a) Co—La—Bi type: | Cobalt oxide | 15–75 mole % |
   | | Lanthanum oxide | 13–45 mole % |
   | | Bismuth oxide | 17–50 mole % |
   | (b) Co—Sr—Ce type: | Cobalt oxide | 15–40 mole % |
   | | Strontium oxide | 40–55 mole % |
   | | Cerium oxide | 15–40 mole % |
   | (c) Co—Sr—Bi type: | Cobalt oxide | 10–40 mole % |
   | | Strontium oxide | 5–50 mole % |
   | | Bismuth oxide | 35–70 mole % |
   | (d) Co—La—Ce type: | Cobalt oxide | 10–40 mole % |
   | | Lanthanum oxide | 10–40 mole % |
   | | Cerium oxide | 30–70 mole % |
   | (e) Co—La—Sr—Bi type: | Cobalt oxide | 15–70 mole % |
   | | Lanthanum oxide | 1–40 mole % |
   | | Strontium oxide | 1–40 mole % |
   | | Bismuth oxide | 25–50 mole % |
   | (f) Co—La—Sr—Ce type: | Cobalt oxide | 10–40 mole % |
   | | Lanthanum oxide | 1–35 mole % |
   | | Strontium oxide | 1–35 mole % |
   | | Cerium oxide | 30–70 mole % |
7. Bi$_{2-x-y}$M'$_x$M$_y$O$_{3-\delta}$ (0 ≤ x ≤ 1, 0 ≤ y ≤ 1, δ from stoichiometry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. BaCe$_{1-x}$Gd$_x$O$_{3-x/2}$ where,
   x equals from zero to about 1.
9. One of the materials of A$_s$A'$_t$B$_u$B'$_v$B"$_w$O$_x$ family whose composition is disclosed in U.S. Pat. No. 5,306,411 (Mazanec et al.) as follows:
   A represents a lanthanide or Y, or a mixture thereof,
   A' represents an alkaline earth metal or a mixture thereof,
   B represents Fe;
   B' represents Cr or Ti, or a mixture thereof;
   B" represents Mn, Co, V, Ni or Cu, or a mixture thereof
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B" in the formula; and 0.9 < (s + t)/(u + v + w) < 1.1
10. One of the materials of Ce$_{1-x}$A$_x$O$_{2-\delta}$ family, where:
    A represents a lanthanide, Ru, or Y; or a mixture thereof, -continued Material composition x equals from zero to about 1;
δ equals a number that satisfies the valences of Ce and A in the formula.
11. One of the materials of $Sr_{1-x}Bi_xFeO_{3-\delta}$ family, where:
A represents a lanthanide or Y, or a mixture thereof;
x equals from zero to about 1;
δ equals a number that satisfies the valences of Ce and A in the formula.
12. One of the materials of $Sr_xFe_yCo_zO_w$ family, where:
x equals from zero to about 1;
y equals from zero to about 1;
z equals from zero to about 1;
w equals a number that satisfies the valences of Sr, Fe and Co in the formula.
13. Dual phase mixed conductors (electronic/ionic):
$(Pd)_{0.5}/(YSZ)_{0.5}$
$(Pt)_{0.5}/(YSZ)_{0.5}$
$(B-MgLaCrO_x)_{0.5}(YSZ)_{0.5}$
$(In_{90\%}Pt_{10\%})_{0.6}/(YSZ)_{0.5}$
$(In_{90\%}Pt_{10\%})_{0.5}/(YSZ)_{0.5}$
$(In_{95\%}Pr_{2.5\%}Zr_{2.5\%})_{0.5}/(YSZ)_{0.5}$
Any of the materials described in 1–13, to which a high temperature metallic phase (e.g., Pd, Pt, Ag, Au, Ti, Ta, W) is added.
14. One of the materials of $A_{2-x}A'_xB_{2-y}B'_yO_{5+z}$ family whose composition is disclosed in WO 97/41060 (Schwartz et al.) as follows:
A represents an alkaline earth metal or a mixture thereof;
A' represents a lanthanide or Y, or a mixture thereof;
B represents a metal ion or mixtures of 3d transition metal ions and group 13 metals;
B' represents a metal ion or mixtures of 3d transition metal ions and group 13 metals, the lanthanides and yttrium;
$0 < x < 2; 0 < y < 2$; z renders the compound charge neutral
15. One of the materials of $Ln_xA'_xCo_yFe_{y'}Cu_{y''}O_{3-z}$ family whose composition is disclosed in EP 0 732 305 A1 (Dyer et al.) as follows:
Ln represents a f block lanthanide;
A' represents Sr or Ca;
$x > 0, y > 0, x + x' = 1, y + y' + y'' = 1, 0 < y \leq 0.4$
z renders the compound charge neutral
16. One of the materials of $Ln_xA'_{x'}A''_{x''}B_yB'_{y'}B''_{y''}O_{3-z}O_{3-z}$ family whose composition is disclosed in EP 0 931 763 A1 (Dyer et al.) as follows:
Ln represents a f block lanthanide;
A' from groups 2;
A'' from groups 1, 2, 3 and f-block lanthanides
B, B' from d-block transition metals excluding Ti and Cr
$0 \leq x < 1, 0 < x' \leq 1, 0 < y < 1.1, 0 \leq y' < 1.1, x + x' + x'' = 1.0$,
$1.1 > y + y' > 1.0$, z renders the compound charge neutral In all three examples, the thermal expansion of the material is considerably less than the single phase $La_{0.2}Sr_{0.8}Fe_{0.8}Cr_{0.2}O_{3-d}$ sample. Moreover, the non-linearity seen in the expansion of the two phase materials is less than observed in $La_{0.2}Sr_{0.8}Fe_{0.8}Cr_{0.2}O_{3-d}$. A comparison of the thermal expansion coefficients of the three CGO/LSCF materials together with single phase $La_{0.2}Sr_{0.8}Fe_{0.8}Cr_{0.2}O_{3-d}$ shows a lower and more linear TEC which is very important to enable sealing materials to be employed, and to match the thermal expansions of the dense and active porous layers.

The chemically induced strain of the two-phase CGO/LSCF materials is also less than the single phase $La_{0.2}Sr_{0.8}Fe_{0.8}Cr_{0.2}O_{3-d}$. The comparison shown in FIG. 3 shows that in all cases, under a reduction in oxygen partial pressure, the initial expansion followed by the contraction of the single phase $La_{0.2}Sr_{0.8}Fe_{0.8}Cr_{0.2}O_{3-d}$ material is not present in the two phase CGO/LSCF materials. It is to be noted that prolonged exposure of the single phase $La_{0.2}Sr_{0.8}Fe_{0.8}Cr_{0.2}O_{3-d}$ to low oxygen partial pressures can produce an irreversible transition.

The comparison of the oxygen flux shown in FIG. 4 for the three CGO/LSCF materials with CGO/Ag+Pd and CGO/LSM shows that less flux is obtained with a pure electronic conductor such as Ag/Pd alloy, or lanthanum strontium manganite (LSM).

The results taken together show that a composite membrane structure having a dense layer and one or more active porous layers in accordance with the present invention can be constructed with more closely matched thermal expansion coefficients to reduce the stress of differential thermal expansion coefficients that would otherwise exist in the membrane architecture of a prior art structure. Additionally stresses produced in the active porous layer are also reduced due to the lack of chemically induced contraction under low oxygen partial pressures. At the same time, the use of the ionic conductor together with the mixed phase conductor in the porous support, or possibly also in the dense layer, produces a membrane that for a given volume of material has a higher oxygen flux capacity while at the same time providing a more robust structure than the single phase and dual phase structures of the prior art.

While the present invention has been discussed in reference to a preferred embodiment, as will occur to those skilled in the art, numerous changes and additions can be made without departing from the spirit and scope of the present invention.

What is claimed is:

1. A method of separating oxygen from an oxygen containing feed stream comprising:
    introducing said feed stream to a cathode side of a ceramic membrane element having a ceramic membrane structure comprising a dense layer and at least one active porous layer, the dense layer containing at least a mixed conducting material and the at least one active porous layer formed of a mixture having an ion conducting phase capable of predominantly conducting oxygen ions and a mixed conducting phase capable of conducting both said oxygen ions and electrons, the ion conducting phase being present within the mixture in an amount greater than a percolation threshold and the mixed conducting material and phase having a greater electronic conductivity than ionic conductivity;
    during the introduction of said feed stream to said cathode side of said ceramic membrane, maintaining said membrane at a temperature of at least about 600° C. and maintaining a pressure difference across said membrane from said cathode side to an opposite anode side thereof.

2. The method of claim 1, wherein said ion conducting phase is formed of a first material having an oxygen ion conductivity greater than about 0.01 S/cm at 1000° C. in air and said mixed conducting phase is formed of a second material having an oxygen ion conductivity of greater than about 0.01 S/cm at 1000° C. in air and an electronic conductivity greater than about 0.02 S/cm at 1000° C. in air.

3. The method of claim 2, wherein said first material is a fluorite, a bismuth oxide, an apetite oxide, and mixtures thereof and said second material is a perovskite or a brownmillerite.

4. The method of claim 2 or claim 3, wherein one of said first and second materials is present within said mixture in an amount of no less than about 5% by volume and the other of the first and second materials is present within said mixture at no greater than about 95% by volume.

5. The method of claim 2 or claim 3, wherein one of said first and second materials is present within said mixture in an amount of no less than about 10% by volume and the other of the first and second materials is present within said mixture at no greater than about 90% by volume.

6. The method of claim 2 or claim 3, wherein one of said first and second materials is present within said mixture in an amount of no less than about 20% by volume and the other of the first and second materials is present within said mixture at no greater than about 80% by volume.

7. A ceramic membrane structure comprising a dense layer and at least one active porous layer, the dense layer containing at least a mixed conducting material and the at least one active porous layer formed of a mixture having an ion conducting phase capable of predominantly conducting oxygen ions and a mixed conducting phase capable of conducting both said oxygen ions and electrons, the ion conducting phase being present within the mixture in an amount greater than a percolation threshold and the mixed conducting material and phase having greater electronic conductivity than ionic conductivity.

8. The ceramic membrane structure of claim 7, wherein said ion conducting phase is formed of a first material having an oxygen ion conductivity greater than about 0.01 S/cm at 1000° C. in air and said mixed conducting phase is formed of a second material having an oxygen ion conductivity of greater than about 0.01 S/cm at 1000° C. in air and an electronic conductivity greater than about 0.02 S/cm at 1000° C. in air.

9. The ceramic membrane structure of claim 8, wherein said first material is a fluorite, a bismuth oxide, an apatite oxide, and mixtures thereof and said second material is a perovskite or a brownmillerite.

10. The ceramic membrane structure of claim 8, or claim 9, wherein on of said first and second materials is present within said mixture in an amount of no less than about 5% by volume and the other of the first and second materials is present within said mixture at no greater than about 95% by volume.

11. The ceramic membrane of claim 8 or claim 9, wherein one of said first and second materials is present within said mixture in an amount of no less than about 10% by volume and the other of the first and second materials is present within said mixture at no greater than about 90% by volume.

12. The method of claim 8 or claim 9, wherein one of said first and second materials is present within said mixture in an amount of no less than about 20% by volume and the other of the first and second materials is present within said mixture at no greater than about 80% by volume.

* * * * *